US012745799B2

(12) United States Patent
Loveday

(10) Patent No.: US 12,745,799 B2
(45) Date of Patent: Sep. 29, 2026

(54) LIQUID SUMP FOR HEATER

(71) Applicant: JT International SA, Geneva (CH)

(72) Inventor: Peter Loveday, Epsom (GB)

(73) Assignee: JT International SA, Geneva (CH)

(*) Notice: Subject to any disclaimer, the term of this patent is extended or adjusted under 35 U.S.C. 154(b) by 693 days.

(21) Appl. No.: 18/021,322

(22) PCT Filed: Aug. 10, 2021

(86) PCT No.: PCT/EP2021/072232
§ 371 (c)(1),
(2) Date: Feb. 14, 2023

(87) PCT Pub. No.: WO2022/034054
PCT Pub. Date: Feb. 17, 2022

(65) Prior Publication Data

US 2023/0301355 A1 Sep. 28, 2023

(30) Foreign Application Priority Data

Aug. 14, 2020 (EP) .................................... 20191173

(51) Int. Cl.
*A24F 40/10* (2020.01)
*A24F 40/42* (2020.01)
(Continued)

(52) U.S. Cl.
CPC .............. *A24F 40/46* (2020.01); *A24F 40/10* (2020.01); *A24F 40/42* (2020.01); *A24F 40/44* (2020.01);
(Continued)

(58) Field of Classification Search
CPC ................................. A24F 40/10; A24F 40/42
See application file for complete search history.

(56) References Cited

U.S. PATENT DOCUMENTS

2015/0335071 A1* 11/2015 Brinkley .............. H05B 1/0297 392/390
2018/0154092 A1 6/2018 Patoret
(Continued)

FOREIGN PATENT DOCUMENTS

CN 209931490 U 1/2020

OTHER PUBLICATIONS

International Search Report for PCT/EP2021/072232 mailed Nov. 18, 2021. 4 pgs.

*Primary Examiner* — Philip Y Louie
*Assistant Examiner* — Charlotte Davison
(74) *Attorney, Agent, or Firm* — Lerner David LLP

(57) ABSTRACT

A capsule for an electronic cigarette has a first end to engage with an electronic cigarette device and a second end as a mouthpiece having a vapour outlet, the capsule further including: a storage reservoir to store a liquid; a vaporising chamber to receive liquid from the storage reservoir; a heating element within the vaporising chamber and including a capillary element configured to vaporise the liquid and generate a vapour; a vapour flow path extending between the vaporising chamber and the mouthpiece to allow the vapour to flow from the vaporising chamber to the mouthpiece; a buffer reservoir in fluid communication with the storage reservoir to allow liquid to flow from the storage reservoir to the buffer reservoir, wherein the buffer reservoir has a fluid capacity that is smaller than that of the storage reservoir; and wherein the capillary element is arranged to contact liquid received in the buffer reservoir.

19 Claims, 6 Drawing Sheets

(51) Int. Cl.
*A24F 40/44* (2020.01)
*A24F 40/46* (2020.01)
*H05B 3/16* (2006.01)

(52) U.S. Cl.
CPC ......... *H05B 3/16* (2013.01); *H05B 2203/021* (2013.01)

(56) References Cited

U.S. PATENT DOCUMENTS

| | | | | |
|---|---|---|---|---|
| 2018/0242643 | A1* | 8/2018 | Silvesstrini | A24B 15/167 |
| 2020/0037667 | A1* | 2/2020 | Woodcock | A24F 40/53 |
| 2020/0138114 | A1* | 5/2020 | Atkins | A24F 40/485 |
| 2021/0378312 | A1* | 12/2021 | Talbot | G01C 9/00 |

* cited by examiner

LIQUID SUMP FOR HEATER

CROSS-REFERENCE TO RELATED APPLICATIONS

The present application is a national phase entry under 35 U.S.C. § 371 of International Application No. PCT/EP2021/072232, filed Aug. 10, 2021, published in English, which claims priority to European Application No. 20191173.2 filed Aug. 14, 2020, the disclosures of which are incorporated herein by reference.

FIELD OF INVENTION

The present invention relates to a liquid sump for a heater in a capsule for an electronic cigarette.

BACKGROUND

Electronic cigarettes are an alternative to conventional cigarettes. Instead of generating a combustion smoke, they vaporize a liquid, which can be inhaled by a user. The liquid typically comprises an aerosol-forming substance, such as glycerin or propylene glycol that creates the vapor. Other common substances in the liquid are nicotine and various flavorings.

The electronic cigarette is a hand-held inhaler system, comprising a mouthpiece section, a liquid store, and a power supply unit. Vaporization is achieved by a vaporizer or heater unit which typically comprises a heating element in the form of a heating coil and a fluid transfer element, such as a wick, arranged to transfer fluid from the liquid store to the heating element. Vaporization occurs when the heater heats up the liquid in the fluid transfer element until the liquid is transformed into vapor. The vapor can then be inhaled via an air outlet in the mouthpiece.

The electronic cigarette may comprise a capsule seating which is configured to receive disposable consumables in the form of capsules. Capsules comprising the liquid store and the vaporizer are often referred to as "cartomizers". In this case, the vaporizer of the cartomizer is connected to the power supply unit when received in the capsule seating of the power supply unit such that electricity can be supplied to the heater of the cartomizer to heat the liquid to generate the vapor. Often some form of mechanical mechanism is used to retain the capsule in the capsule seating such that it does not fall out and separate from the device.

In order to transfer liquid from the liquid store to the heating element, the wick must be arranged between the liquid store and vaporization chamber such that, when the wick is heated, capillary action transports liquid through the porous structure of the wick from the liquid store to the heating element.

It is an object of the present invention to provide an improved transfer of liquid to the heater.

SUMMARY OF INVENTION

According to a first aspect there is provided a capsule for an electronic cigarette, the capsule having a first end configured to engage with an electronic cigarette device and a second end arranged as a mouthpiece portion having a vapour outlet. The capsule further comprises a storage reservoir configured to store a liquid to be vaporised. A vaporising chamber is arranged to receive liquid from the storage reservoir. A heating element is housed within the vaporising chamber, the heating element comprising a capillary element configured to vaporise the received liquid and generate a vapour. A vapour flow path extends between the vaporising chamber and the mouthpiece to allow the generated vapour to flow from the vaporising chamber to the mouthpiece. A buffer reservoir in fluid communication with the storage reservoir to allow liquid to flow from the storage reservoir to the buffer reservoir, wherein the buffer reservoir has a fluid capacity that is smaller than a fluid capacity of the storage reservoir. The capillary element is arranged to contact liquid received in the buffer reservoir.

The storage reservoir may be considered as a primary liquid reservoir and the buffer reservoir may be considered as a secondary liquid reservoir. The secondary liquid reservoir is smaller than the primary liquid reservoir. At least part of the heating element, namely the capillary element, is arranged in the buffer reservoir meaning that the heating element is fed liquid to be vaporised indirectly from the storage reservoir. That is to say, liquid to be vaporised stored within the storage reservoir flows into and out of the buffer reservoir before it is received by, and vaporised by, the heating element. In other words, the heating element is fed from a secondary liquid reservoir that in turn is fed by one or more liquid conduits from the primary liquid reservoir. By arranging the capillary element to contact the liquid in the buffer reservoir, the heating element is in substantially constant contact with a volume of liquid, which provides a substantially constant flow of liquid to the heating element. This prevents the heating element from drying out during use of the capsule. The capsule may therefore provide improved feeding of the heating element with liquid, providing a substantially constant flow of liquid to the heating element.

Preferably, the buffer reservoir extends in a direction that is parallel to an extension of the heating element. More preferably, the buffer reservoir and the heating element extend in a direction that is perpendicular to a longitudinal axis of the capsule. The surface area of the heating element in contact with the buffer reservoir is therefore increased compared to arrangements in which the buffer reservoir extends in a direction that is perpendicular to an extension of the heating element. Liquid transfer between the buffer reservoir and the heating element is therefore improved.

The buffer reservoir may be fluidly connected to the storage reservoir by a fluid conduit. The conduit therefore enables fluid to flow between the storage reservoir and the buffer reservoir.

The heating element may comprise a heating surface. Preferably, the buffer reservoir is located adjacent to a surface of the heating element which is substantially opposite to the heating surface. More preferably, the buffer reservoir is located adjacent to the capillary element of the heating element. This may allow for efficient transfer of liquid from the buffer reservoir to the heating element.

In some examples, the heating element, the heating surface, and the capillary element may be integrally formed. That is, the heating element, the heating surface, and the capillary element may all form a single component. The single component may be referred to as the heating element. This may ensure efficient fluid transfer through the heating element by ensuring good fluid communication between the heating surface and the capillary element. A single component may also help reduce the change of leaks between the capillary element and the heating surface. In addition, this may reduce the overall number of components within the capsule which may reduce the complexity of the capsule and reduce manufacturing costs.

The heating surface may be considered a first portion of the heating element and the capillary element may be considered a second portion of the heating element. The first and second portions of the heating element, and therefore the heating surface and the capillary surface may be substantially opposite each other.

The heating element may be formed from a porous material. The heating surface may be formed from a porous material. The capillary element may be formed from a porous material. Preferably the heating element which includes the heating surface and the capillary element may be formed from a porous material. The porous material may be a rigid ceramic. The porous material may facilitate liquid transfer through the heating element, from the capillary element to the heating surface, via capillary action. Preferably, the heating element is arranged between the storage reservoir and the buffer reservoir. The buffer reservoir may therefore be considered as being located underneath the heating element, when the capsule is held vertically in its operative configuration with the mouthpiece being located at the top of the capsule, above the rest of the capsule. In other words, the mouthpiece is at the highest level when the capsule is held vertically in its operative configuration. This arrangement may allow a heating element to be indirectly fed by the storage reservoir in a controlled manner while providing improved liquid availability to the capillary element.

The storage reservoir may be located closer to the mouthpiece than the buffer reservoir. Thus, the storage reservoir may be located above the buffer reservoir when the capsule is held vertically in its operative configuration. This means that liquid can flow from the storage reservoir to the buffer reservoir via the conduit under the action of gravity. The buffer reservoir can therefore be automatically filled by the storage reservoir during use of the capsule.

The buffer reservoir can be located between the first end and the heating element or vaporizing chamber. The storage reservoir can be located between the second end and the heating element or vaporising chamber.

In some examples, at least part of the heating element is located within the buffer reservoir. Preferably, at least part of the capillary element is located within the buffer reservoir. This ensures good fluid communication between the buffer reservoir and the heating element.

The buffer reservoir comprises a substantially constant volume of liquid along the length of the buffer reservoir, wherein the length of the buffer reservoir is adjacent at least one surface of the heating element. In some examples, the buffer reservoir is configured to hold a volume of liquid having a depth of 1 mm or less adjacent to the capillary element. More preferably, the length of the buffer reservoir is adjacent at least one surface of the capillary element. This arrangement may provide an increased contact surface area between the heating element and the buffer reservoir, ensuring optimal transfer of liquid from the buffer reservoir to the heating element.

Preferably, the depth of the liquid in the sump is about 1 mm or less. Preferably, the heating element, and more preferably the capillary element, is supported in the buffer reservoir by at least one spacer. This may ensure that a space, or gap, is created between the heating element and a floor of the buffer reservoir to ensure that liquid is able to flow around the heating element. In some examples, the at least one spacer may comprise at least one rib. Alternatively, the at least one spacer may comprise at least one bump.

The at least one spacer may comprise part of the heating element. Preferably, the at least one spacer comprises part of the capillary element. This may reduce the number of individual components within the capsule.

In some cases, the at least one spacer comprises a wall of the buffer reservoir. The wall may be located substantially opposite to the capillary element. Thus, the wall may be located substantially opposite to the heating element.

The buffer reservoir may be delimited by a holder of the capsule and a seal member. The holder may comprise a sump. In some examples, the sump may be the buffer reservoir. A main function of the sump is to feed liquid to the heater indirectly and with small volumes of fluid. This means that the liquid feed to the heater is more homogeneous. The sump may additionally be arranged to collect liquid which has not been vaporized and recycle this liquid back to the heating element.

In some examples, the buffer reservoir and the vaporizing chamber are separated from each other by the heating element, preferably the capillary element, and the seal member.

Preferably, the storage reservoir is delimited by an outer casing of the capsule, the seal member, and the mouthpiece. The mouthpiece may be located substantially opposite to the seal member.

The vapor flow path may comprises a vapor tube connecting the vaporizing chamber to the mouthpiece. In some cases, the vaporizing chamber is sealed by the seal member. The seal is preferably a fluid seal. This may prevent the flow of vapor and liquid from the storage reservoir to the heating element. The seal may further be arranged to prevent liquid bypassing the capillary element and instead ensuring that liquid from the buffer reservoir is transferred via the capillary element to the heating element. The seal may be further arranged to ensure fluid tight arrangement in the vapor tube, between the storage reservoir and the vapor tube, and between the vapor tube and the buffer reservoir.

Preferably, the capsule further comprises an airflow path extending between an air inlet of the capsule and the vaporising chamber for allowing air to flow into the vaporising chamber. The air inlet may be located on an outer surface of the holder. This provides a convenient entry point for air to enter the capsule.

According to another aspect there is provided an electronic cigarette comprising a main body and a capsule wherein the main body comprises a power supply unit, electrical circuitry, and a capsule seating configured to connect with the capsule, the capsule comprising: a first end configured to engage with the electronic cigarette device and a second end arranged as a mouthpiece portion having a vapour outlet, the capsule further comprising: a storage reservoir configured to store a liquid to be vaporised; a vaporising chamber arranged to receive liquid received from the storage reservoir; a heating element housed within the vaporising chamber, the heating element comprising a capillary element configured to vaporise the received liquid and generate a vapour; a vapour flow path extending between the vaporising chamber and the mouthpiece to allow the generated vapour to flow from the vaporising chamber to the mouthpiece; a buffer reservoir in fluid communication with the storage reservoir to allow liquid to flow from the storage reservoir to the buffer reservoir, wherein the buffer reservoir has a fluid capacity that is smaller than a fluid capacity of the storage reservoir; and wherein the capillary element is arranged to contact liquid received in the buffer reservoir.

There may also be provided an electronic cigarette comprising a capsule according to any of the above described capsules.

BRIEF DESCRIPTION OF DRAWINGS

Embodiments of the present invention will now be described by wait of example with reference to the accompanying drawings in which.

DETAILED DESCRIPTION

Figure 1A:
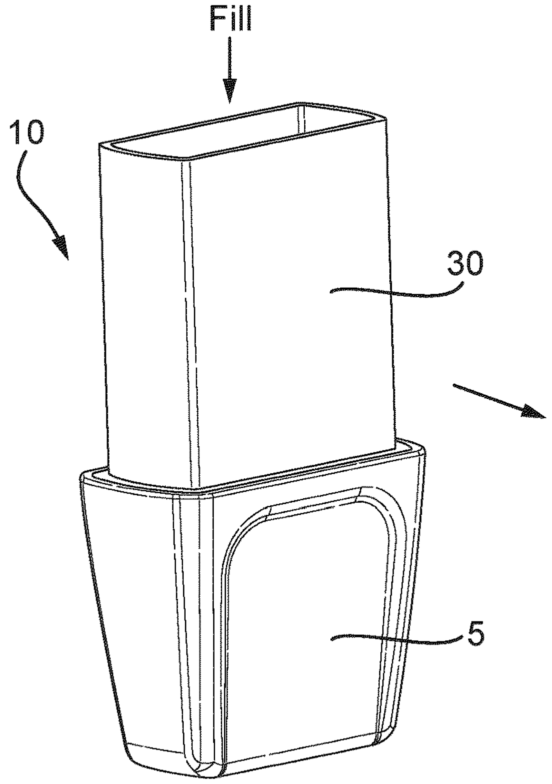
FIG. 1*a* shows a perspective view of part of a capsule for an electronic cigarette.
Figure 1B:
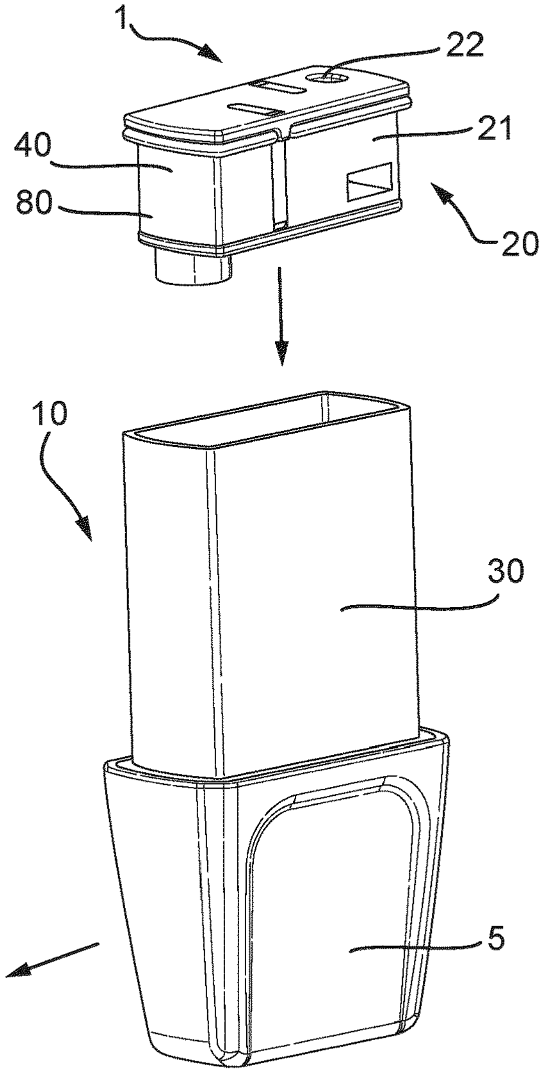
FIG. 1*b* shows an exploded perspective view of a capsule for an electronic cigarette.
Figure 1C:
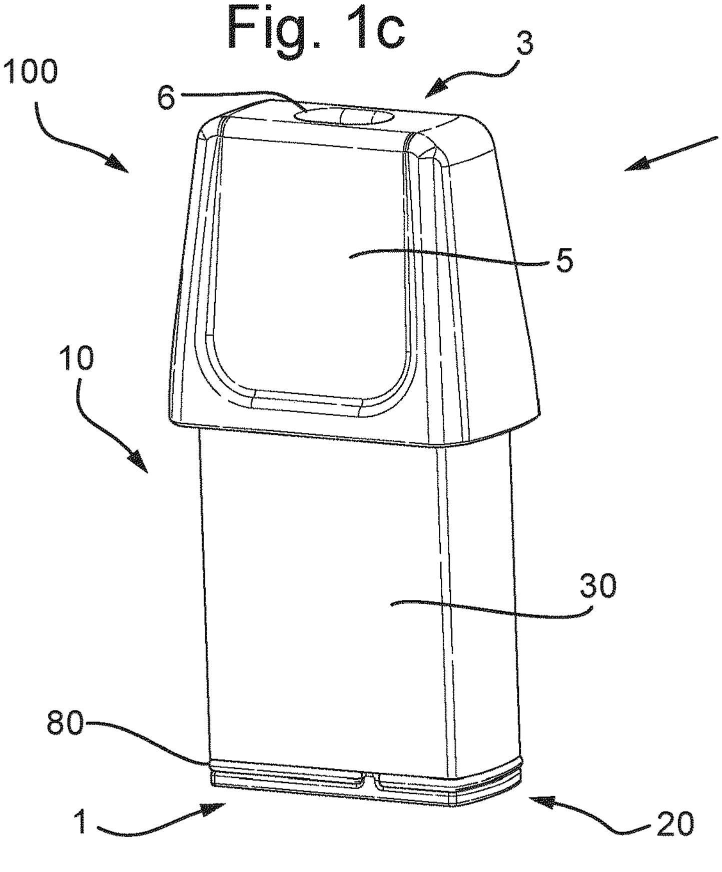
FIG. 1*c* shows a perspective view of a capsule for an electronic cigarette.

FIG. 1*c* illustrates a capsule 100 for an electronic cigarette. As most clearly shown in FIG. 1*b* the capsule 100 comprises an upper housing portion 10 and a lower housing portion 20 which are configured to connect together to form the capsule 100. The capsule has a first end 1 configured to engage with an electronic cigarette device and a second end 3 arranged as a mouthpiece portion 5 having a vapour outlet 6.

Figure 4C:
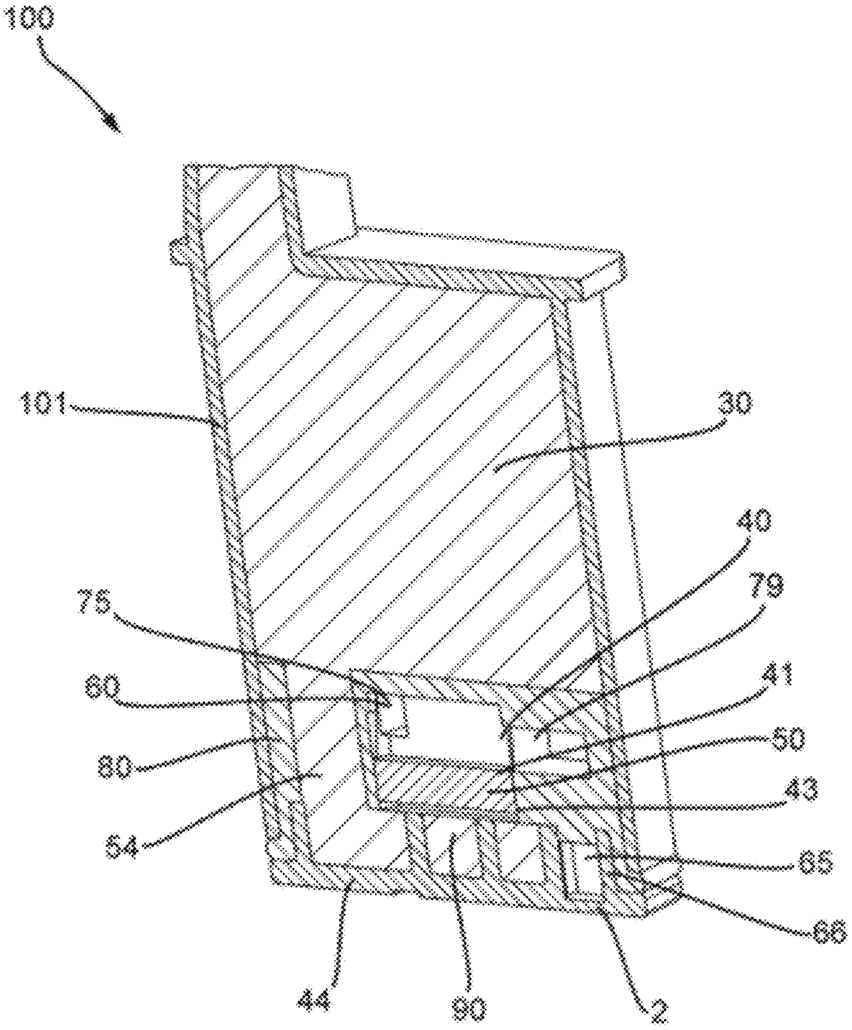
FIG. 4*c* shows a cross sectional view of a liquid sump in a capsule for an electronic cigarette.
Figure 5:
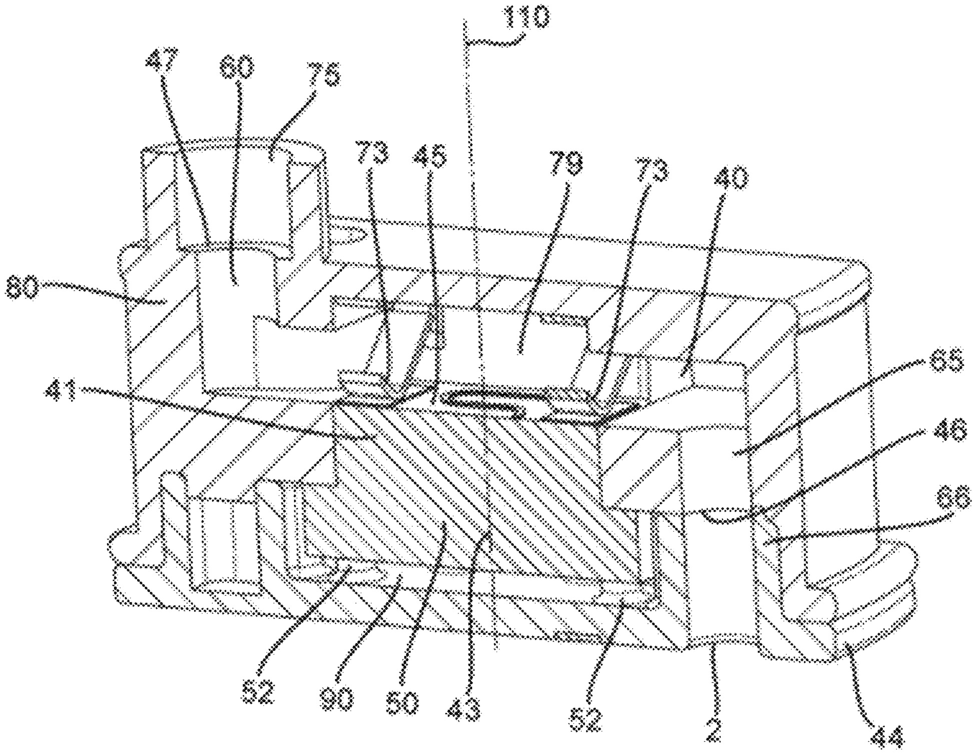
FIG. 5 shows a cross section view of a lower housing portion for a capsule for an electronic cigarette.

The upper housing portion 10 includes a storage reservoir 30 arranged to contain a liquid to be vaporised. The lower housing portion 20 includes a vaporising chamber 40, where the vaporising chamber 40 has an air inlet 46 and a vapour outlet 47 as shown in FIG. 5. The vaporising chamber 40 is arranged to receive liquid from the storage reservoir 30. A fluid transfer element 50 is positioned between the storage reservoir 30 and the vaporising chamber 40, and is arranged to transfer liquid between the storage reservoir 30 and the vaporising chamber 40 by capillary action, as illustrated in FIG. 4*c*. The fluid transfer element 50 may comprise a heating element 41 located within the vaporising chamber 40 and a capillary element 43 which is arranged to heat the liquid that is transferred by capillary action from the storage reservoir 30. The heating element 41 therefore vaporises the liquid in order to generate a vapour. A flow path 60, which may also be referred to as a fluid pathway 60, extends between the vaporising chamber 40 and the mouthpiece 5 in order to allow the generated vapour to flow from the vaporising chamber 40 to the mouthpiece 5.

The fluid transfer element 50 generally takes the form of a capillary-style wick which is configured to transport liquid from the storage reservoir 30 through to the vaporising chamber 40 via capillary action through the wick structure, driven by the evaporation of liquid from the centre of the wick by the heating element 41. Generally, the fluid transfer element has an elongate form which extends across the internal volume of the vaporising chamber 40. In this way, when the upper and lower housing portions are brought together as shown in FIG. 1*b* and the internal volume of the storage reservoir 30 is filled with liquid, as shown in FIG. 1*a*, the fluid transfer element 50 is in fluid communication with the liquid within the internal volume of the storage reservoir 30 and so liquid is drawn into the vaporising chamber 40 through the fluid transfer element 50 during heating.

Figure 2A:
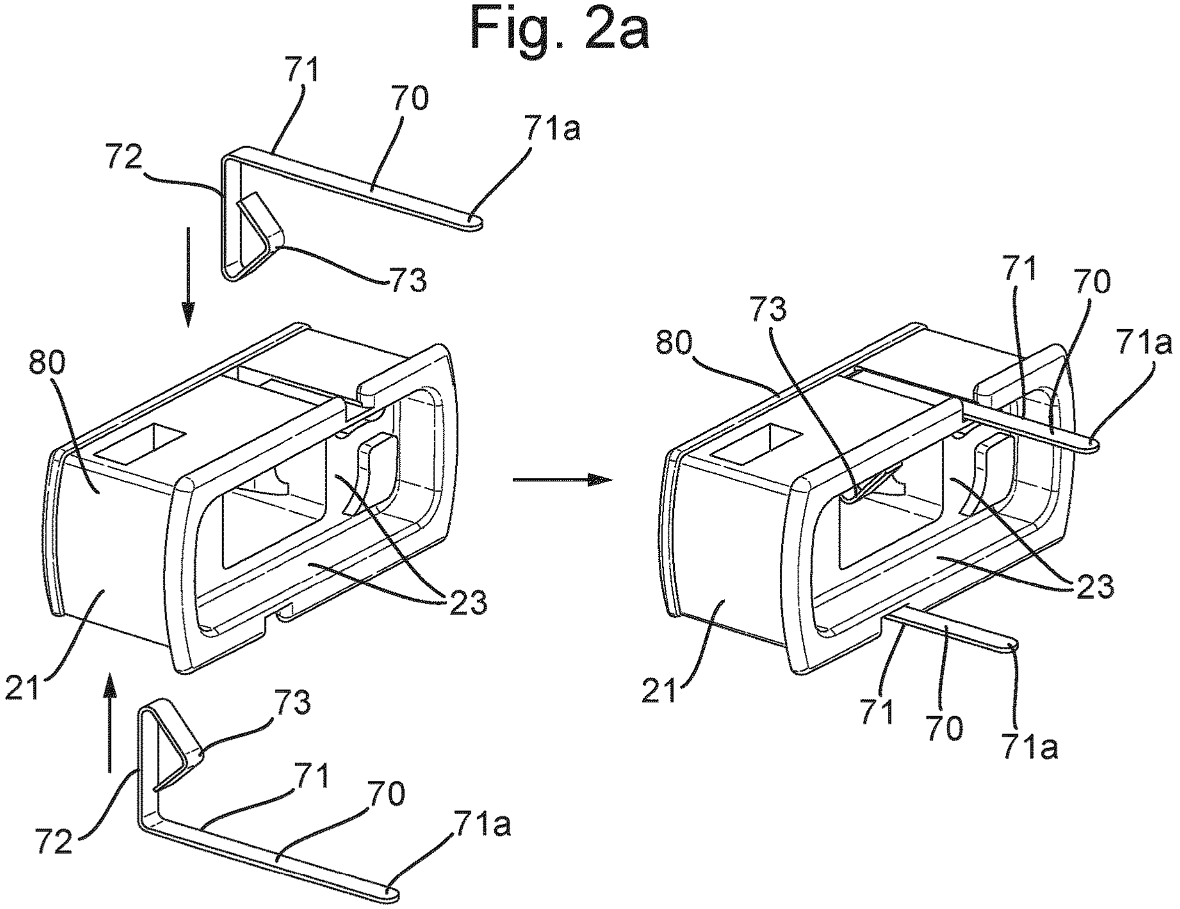
FIG. 2*a* shows a perspective view of a seal member of a capsule for an electronic cigarette.
Figure 3A:
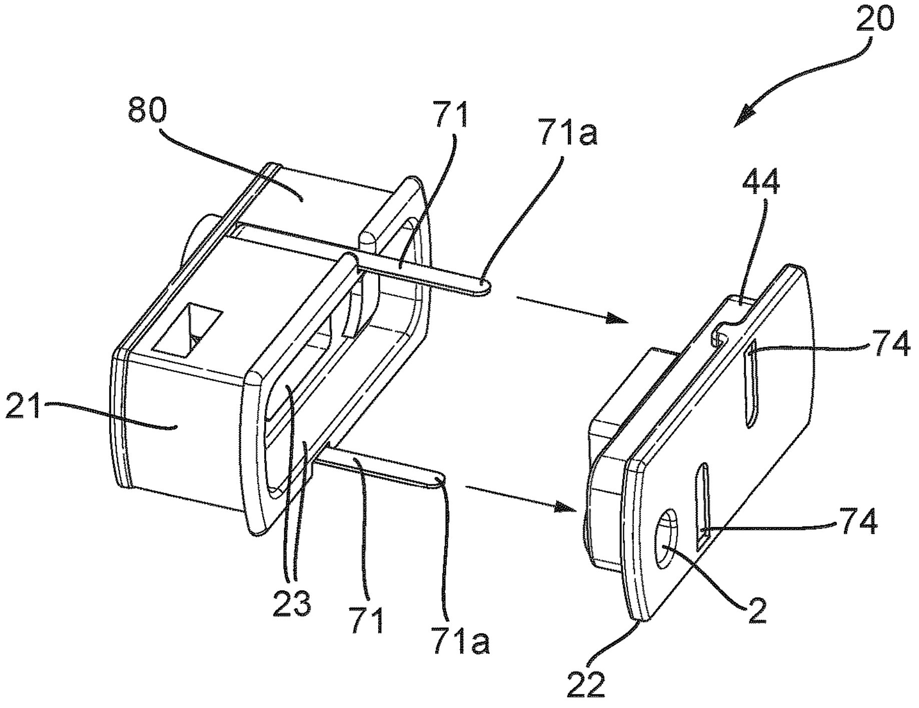
FIG. 3*a* shows an exploded perspective view of a lower housing portion of a capsule for an electronic cigarette.
Figure 3B:
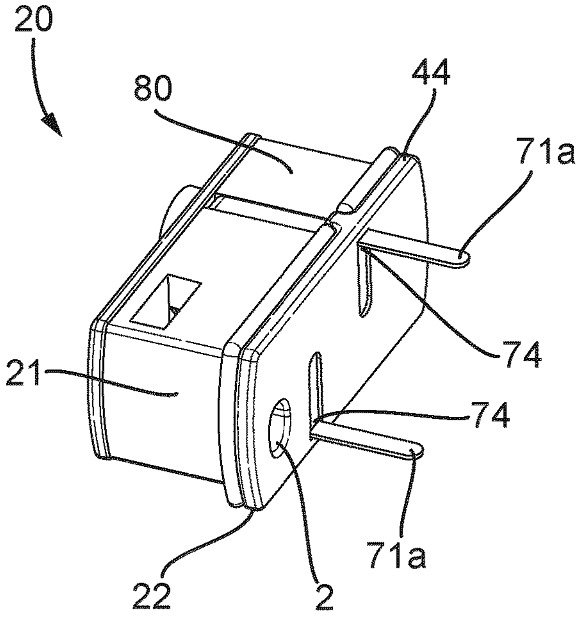
FIG. 3*b* shows a perspective view of a lower housing portion of a capsule for an electronic cigarette.
Figure 3C:
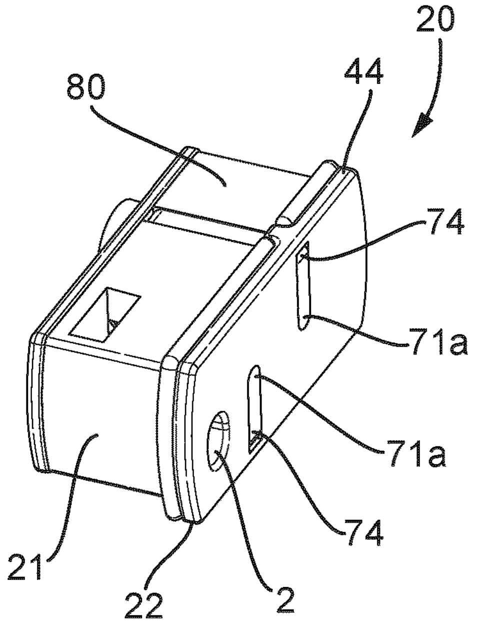
FIG. 3*c* shows a perspective view of a lower housing portion of a capsule for an electronic cigarette.

The lower housing portion 20 comprises a seal member 80 and a holder 44, as shown in FIGS. 3*a*-3*c*. The seal member 80 has an outer housing wall 21 defining the outer bounds of the lower housing portion 20. As most clearly shown in FIG. 2*a* the seal member 80 also has a number of internal walls 23 which are arranged to engage with the holder 44. The seal member 80 is arranged substantially opposite to the mouthpiece 5.

As can be seen from FIG. 1*b*, two integral housing portions, i.e. the upper housing portion 10 and the lower housing portion 20, together form part of the outer housing of the capsule 100 as well as each of the vaporising chamber 40 and storage reservoir 30. The storage reservoir 30 is therefore delimited by an outer casing 101 of the capsule 100, the seal member 80, and the mouthpiece 5, as shown in FIG. 4*c*. This configuration simplifies the assembly of the capsule because the insertion of separate components within the outer housing, for example to provide the vaporising chamber or the storage reservoir, is not required. Furthermore, the alignment of components, which when not precisely achieved can lead to leakage, can be more accurately achieved by having fewer individual and separately installable components.

Figure 2B:
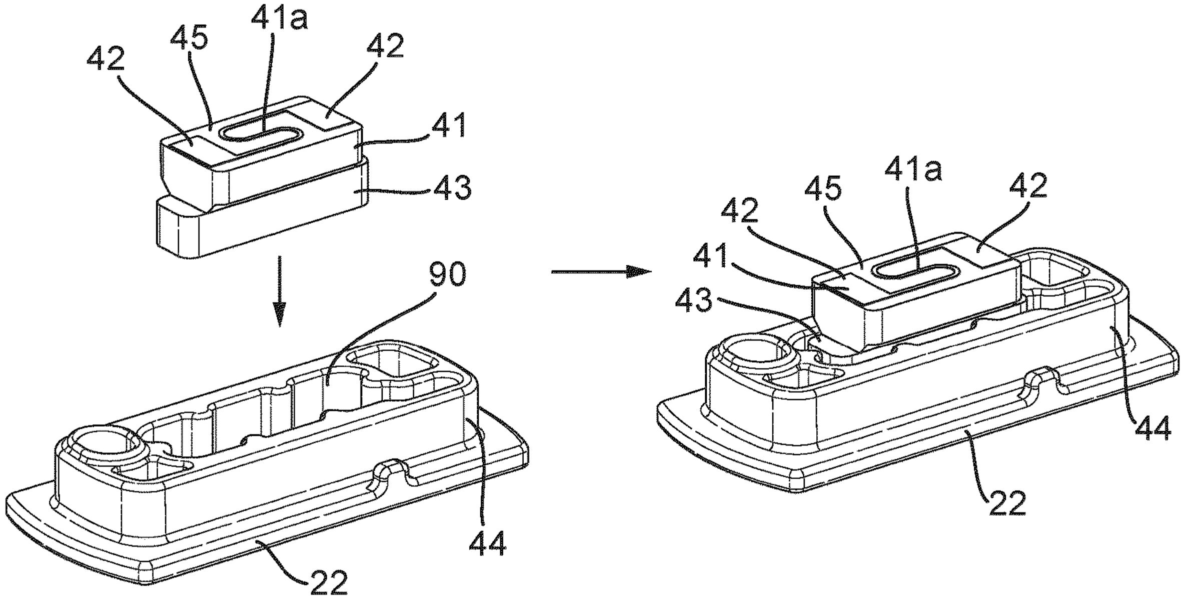
FIG. 2*b* shows a perspective view of a holder of a capsule for an electronic cigarette.

As shown, for example, in FIG. 2*b*, the heating element 41 comprises two ends 42 which are arranged to contact first and second electrical contact elements 70. The ends 42 are spaced apart in the transversal direction of the capsule 100. By providing power to the electrical contact elements 70 and subsequently to the heating element 41 a current can be provided through the heating element 41 to heat the heating element 41 and vaporise a liquid transferred from the storage reservoir 30 through the fluid transport element 50 within the vaporising chamber 40. The heating element 41 is held within the holder 44 which forms the base 22 of the lower housing portion 20.

As can be seen in FIG. 2*b*, each electrical contact element 70 comprises a longitudinally extending portion 71 which extends substantially parallel to a longitudinal axis of the capsule 100 and a base portion 72 which extends substantially perpendicular to a longitudinal axis of the capsule 100. The base portion 72 of each contacting plate 70 comprises a folded region 73 having a substantially triangular shape. The folded region 73 of each electrical contact element 70 is arranged to come into contact with the two ends 42 of the heating element 41.

The electrical contact elements 70 provide the additional function of coupling the seal member 80 to the holder 44 of the lower housing portion 20. As shown in FIGS. 3*a* and 3*b*, each longitudinally extending portion 71 passes through a corresponding aperture 74 in the holder 44. The free ends 71*a* of the longitudinally extending portions 71 are then folded such that they lie substantially flush with an external surface of the base 22, as shown in FIG. 3*c*. The free ends 71*a* of the electrical contact elements 70 therefore hold the holder 44 and seal member 80 together to form the lower housing portion 20.

The electrical contact elements 70 are therefore arranged in a substantially U-shaped manner, having a vertically extending portion (i.e. the longitudinally extending portions 71) and two horizontally extending portions (i.e. the base portion 72 and the free ends 71*a*). It should be noted that vertical and horizontal directions are defined with reference to the capsule when it is held in its operative configuration, as shown in FIG. 1*c*. Thus, both the base portion 72 and the free ends 71*a* extend in a direction substantially perpendicularly to the longitudinally extending portion 71. The base portion 72 and the free ends 71*a* are substantially parallel to each other.

In this way when the capsule 100 is received in an aerosol generating device, for example a main body of an electronic cigarette, the free ends 71*a* of the electrical contact elements 70 are exposed through the lower housing portion 20, as shown in FIG. 3*c*, such that they may contact corresponding contacts which are connected to the battery in order to provide current through the contact plate 70 to the heating wire 41.

Further details of the heating element 41 and the storage reservoir 30 will now be described.

As mentioned, and with reference to FIG. 5, the capsule comprises a fluid pathway 60 which extends from an air inlet 2 of the capsule 100 to the outlet 6 in the mouthpiece 5. The fluid pathway 60 comprises an airflow path 65, a vaporisation flow path 79, and a vapour flow path 75, as shown in FIG. 4*c*. The airflow path 65 extends through the holder 44 between the air inlet 2 of the capsule 100 and the inlet of the vaporising chamber 40, in order to allow air to enter the vaporising chamber 40. As illustrated in FIG. 5, the vaporisation flow path 79 extends through the vaporising chamber 40 between the inlet 46 and the vapour outlet 47 of the vaporising chamber 40. The vapour flow path 75 extends through the upper housing portion 10 between the vapour outlet and the mouthpiece 5, in order to allow the generated vapour to flow from the vaporising chamber to the mouthpiece 5.

As shown in FIG. 4*c* the holder 44 of the lower housing portion comprises a tubular wall 66 extending through the holder 44, which defines the airflow path 65. The airflow path 65 may be thought of as a tubular passageway or conduit aligned with the elongate axis of the capsule 100. In other words, the airflow path 65 is substantially parallel to a longitudinal axis 110 of the capsule 100, as can be seen in FIG. 5. The airflow path 65 extends partially into the seal member 80 in order to fluidly connect with the inlet 46 of the vaporising chamber 40. The air inlet 2 is located on an outer surface of the holder 44.

Similarly the upper housing portion 10 includes an outer wall 101 forming an outer boundary of the storage reservoir 30 and a tubular wall which defines the vapour flow path 75 extending between the vaporising chamber 40 and the mouthpiece 5. The vapour flow path 75 may be thought of as a tubular passageway or conduit aligned with the elongate axis of the capsule 100. In other words, the vapour flow path 75 is substantially parallel to a longitudinal axis 110 of the capsule 100, as can be seen in FIG. 5.

The vaporisation flow path 79 extends in a direction that is substantially perpendicular to an axial direction (i.e. a longitudinal axis) of the capsule 100. The vaporisation flow path 79 may therefore be thought of as a transversal passageway. This arrangement increases the length of the vaporisation flow path 79 across the heating element 41. The heating element 41 is therefore exposed to a longer vaporisation flow path 79 allowing a more consistent, as well as a greater volume, of vapour to be generated.

As has been mentioned previously, the heating element 41 comprises a capillary type heating element having two ends 42. The heating element 41 includes a capillary element 43 which is arranged to receive the liquid to be vaporised from the storage reservoir 30 and a heating surface 45 which is arranged to vaporise the received liquid. The capillary element 43 therefore carries out the function of the previously described fluid transfer element 50.

As can be seen at least in FIG. 5, the heating element 41, the heating surface 45, and the capillary element 43 are integrally formed with each other. In other words, the heating element 41, the heating surface 45, and the capillary element 43 all form a single component, which is generally referred to as the heating element 41. Thus, the heating surface 45 and the capillary element 43 are different portions of the overall heating element 41 component, which are located substantially opposite each other.

The capillary element 43 is arranged opposite to the heating surface 45 of the heating element 41 which is in contact with the air flow. As shown in FIG. 2*a*, the heating surface 45 is arranged between the main body of the heating element 41 and the vaporising chamber 40, while the capillary element 43 is arranged between the main body of the heating element 41 and the base 22 of the holder 44.

The heating surface 45 of the heating element 41 essentially extends in a transversal direction and the air flow through the vaporisation flow path 79 flows in the same direction. As a result of capillary action, the liquid is drawn axially through the capillary element 43 to the heating surface 45. Thus, liquid is drawn through the heating element 41 in a substantially vertical direction whilst air flows through the vaporisation flow path 79 in a transverse direction, when the capsule is oriented vertically with the mouth piece above.

In order to aid transfer of the liquid between the storage reservoir 30 and the heating surface 45, the heating surface 45 and the capillary element 43 are in fluid communication with each other. To facilitate the transfer the heating element 41, including the heating surface 45 and the capillary element 43, is formed from a rigid, porous ceramic, which transfers the liquid via capillary action through the porous structure, driven by the evaporation of liquid by the heating element 41. In other words, the heating surface 45 and the capillary element 43 are both formed from a rigid, porous ceramic. Liquid is therefore transferred via capillary action through the overall porous structure of the heating element 41 from the capillary element 43 to the heating surface 45.

A heater track 41*a* is positioned on the heating surface 45, between the two ends 42 of the heating element 41. In some examples, the heater track 41*a* is directly printed onto a ceramic surface of the heating element 41. The heater track 41*a* vaporises the received liquid which causes the liquid vapour to be generated within the vaporising chamber 40, which then flows along the vaporisation flow path 79 and out of the vaporising chamber 40.

Figure 4A:
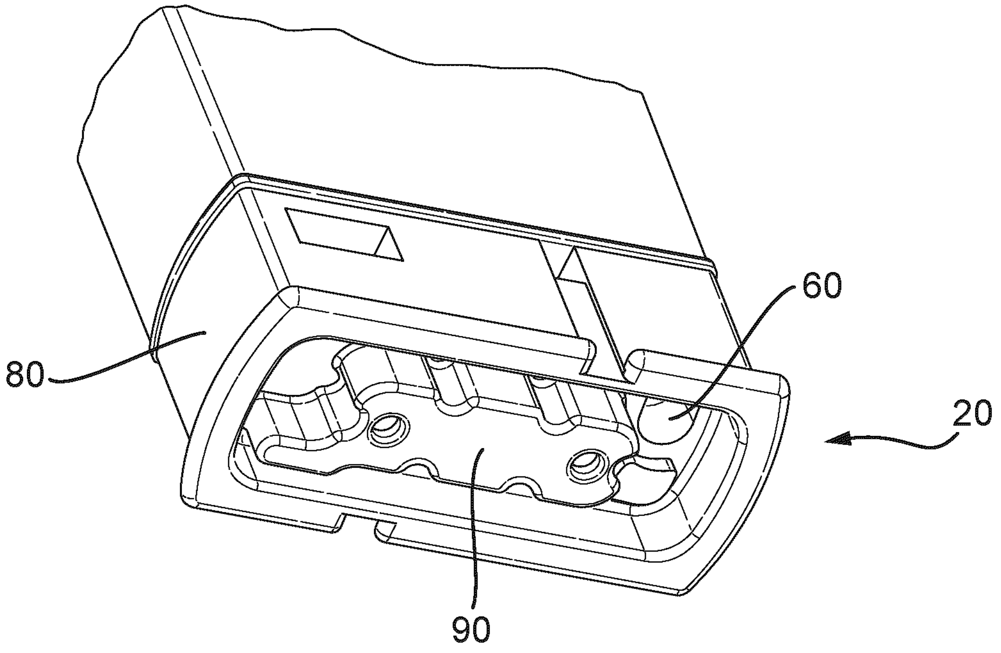
FIG. 4*a* shows a perspective view of a liquid sump in a capsule for an electronic cigarette.

As well as the storage reservoir 30, the capsule 100 also includes a buffer reservoir 90 located within the lower housing portion 20, as illustrated in FIG. 4*a* and FIG. 5, and arranged to store a volume of liquid for vaporisation. The buffer reservoir 90 may also be referred to as a liquid sump 90. The volume of the buffer reservoir 90 is smaller than the volume of the storage reservoir 30, and so the buffer reservoir 90 has a fluid capacity that is smaller than a fluid capacity of the storage reservoir 30. A liquid conduit provides a fluid connection between the buffer reservoir 90 and the storage reservoir 30. The storage reservoir 30 is located between the mouthpiece 5 and the heating element 41. The storage reservoir 30 may therefore be considered as being located closer to the mouthpiece 5 than the buffer reservoir 90. This means that when the capsule is held vertically in its operative configuration, as shown in FIG. 1*c*, the storage reservoir 30 is located above the buffer reservoir 90. This arrangement allows liquid to flow from the storage reservoir 30 through the liquid conduit to the buffer reservoir 90 under the action of gravity. The buffer reservoir can therefore be filled up, or replenished, using liquid from the storage reservoir under the action of gravity alone, without the need for additional components.

The buffer reservoir 90 is formed such that it is able to store a substantially constant volume of liquid along the length of the buffer reservoir 90, wherein the length of the buffer reservoir 90 is in a direction that is perpendicular to a longitudinal axis of the capsule 100. The heating element 41 is arranged between the storage reservoir 30 and the buffer reservoir 90. In other words, the buffer reservoir 90 is located underneath the heating element 41 when the capsule is held vertically in its operative configuration, as illustrated in FIG. 4*c*.

Figure 4B:
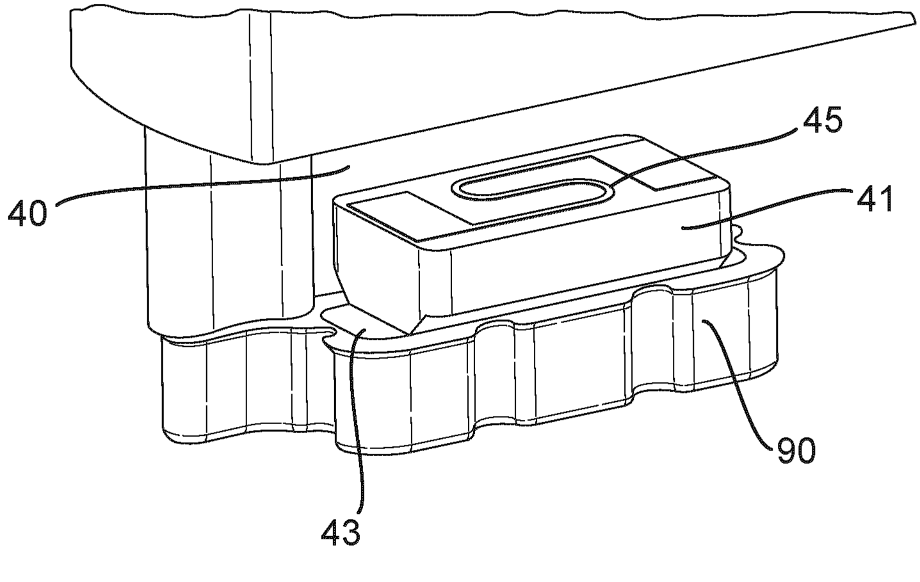
FIG. 4*b* shows a perspective view of a liquid sump in a capsule for an electronic cigarette.

In order that the liquid in the buffer reservoir 90 can be vaporised by the heating element 41, the buffer reservoir 90 is located adjacent to the heating element 41, as can be seen in FIG. 4*b*. Specifically, the buffer reservoir 41 is adjacent to the capillary element 43 of the heating element 41 so that the liquid in the buffer reservoir 90 is drawn through the liquid capillary part 43 to the heating surface 45, by capillary action. As mentioned, the heating element 41 extends in transversal direction and so the length of the buffer reservoir 90 is parallel to the length of the heating element 41. The buffer reservoir 90 is therefore arranged to that it extends along a direction that corresponds to the direction of extension of the heating element 41. As a result of this arrangement, the liquid-to-heating element surface contact area is increased compared configurations in which a liquid reservoir and heating element are arranged perpendicularly to each other. In other words, the liquid contact surface of the heating element 41, namely the capillary element 43, is directly opposite to the heating surface 45 of the heating element 41. Since the liquid is fed to the heating element 41 from the underside of the heater element 41, the liquid transfer is improved and an optimal use of liquid in the buffer reservoir 90 is obtained. Furthermore, this configuration results in reduced liquid pressure in the buffer reservoir, compared to standard configurations.

To further improve the transfer of liquid from the buffer reservoir 90 to the heating surface 45, a portion of the heating element 41 is located within the buffer reservoir 90. The heating element 41, in particular the capillary element 45, is supported in the buffer reservoir 90 by a number of spacers 52, illustrated in FIG. 5. The spacers 52 ensure that the heating element 41 is spaced apart from the base, or floor, of the buffer reservoir 90 so that liquid can flow around the spacers 52 and around the heating element 41, in particular around the capillary element 45. The spacers 52 form part of the heating element 41 and are located adjacent the capillary element 45. In some cases, the spacers form part of the capillary element 43. The spacers 52 may take the form of a rib or a bump.

The spacers 52 therefore provide a support function and are constructed so that liquid cannot flow through the spacers 52. The spacers 52 can therefore be thought of as forming part of the wall of the buffer reservoir 90. The wall is located substantially opposite to the heating element 41, in particular substantially opposite to the capillary element 43.

The buffer reservoir 90, or liquid sump 90, therefore provides a secondary reservoir within the capsule 100 wherein the storage reservoir 30 is the primary reservoir. This secondary reservoir is located underneath the heating element, as shown in FIG. 4*c*.

Since the capillary element 43 is at least partially located within the buffer reservoir 90, the heating surface 45 of the heating element 41 is indirectly fed liquid to be vaporised from the storage reservoir 30. In other words, liquid to be vaporised stored within the storage reservoir 30 flows into and then out of the buffer reservoir 90 before it is received by the heating element 41. Liquid from the storage reservoir 30 is fed to the buffer reservoir by a side port 54, shown in FIG. 4*c*. By arranging the capillary element 43 within the buffer reservoir 90, the heating element 41 is in substantially constant contact with a volume of liquid, which provides a substantially constant flow of liquid to the heating element 41. This prevents the heating element 41, in particular the heating surface 45, from drying burning during use of the capsule.

As can be seen in FIG. 4*c*, the heating element 41 is located between the holder 44 and the seal member 80. The seal member 80 forms part of the vaporising chamber 40, the air inlet of the vaporising chamber, and the vapour outlet of the vaporising chamber. These components are therefore integrally formed with the seal member 80, reducing the complexity of the capsule 100. By using a single component (i.e. the seal member 80) rather than a number of individually formed components which need to be connected together, the chance of liquid leaking, for example through joins between the components, is reduced. The seal member 80 may also form the liquid conduit between the storage 30 and the liquid sump.

Together with the holder 44, the seal member 80 delimits the buffer reservoir 90, in particular an upper boundary of the buffer reservoir 90, as can be seen in FIGS. 2*a* and 2*b*. The buffer reservoir 90 is therefore separated from the vaporising chamber 40 by the heating element 41 and the seal member 80. The seal member 80 prevents liquid from leaking from the buffer reservoir 90 into the vaporising chamber 40.

In addition, the heating surface 43 of the heating element 41 can be thought of as forming part of a surface of the seal member 80. As such, the heating surface 45 of the heating element 41 delimits the vaporizing chamber 40, in particular the lower boundary of the vaporizing chamber 40. The heating surface 45 therefore forms a fluid seal with the seal member 80, preventing the flow of vapor and liquid from the vaporizing chamber 40 to the heating element 41. The vaporizing chamber 40 is therefore sealed by the seal member 80.

As the skilled person will appreciate, the capsule described above, and any of its modifications, can be used as part of an electronic cigarette. For example, an electronic cigarette comprises a main body having a power supply, electrical circuitry, and a capsule seating. The capsule seating of the main body is arranged to engage with and electrically connect with the first end 1 of the capsule described above.

The invention claimed is:

1. A capsule for an electronic cigarette, the capsule having a first end configured to engage with an electronic cigarette device and a second end arranged as a mouthpiece having a vapour outlet, the capsule further comprising:

a storage reservoir configured to store a liquid to be vaporised;

a vaporising chamber arranged to receive liquid from the storage reservoir;

a heating element housed within the vaporising chamber, the heating element comprising a capillary element configured to vaporise the received liquid and generate a vapour;

a vapour flow path extending between the vaporising chamber and the mouthpiece to allow the generated vapour to flow from the vaporising chamber to the mouthpiece;

a buffer reservoir in fluid communication with the storage reservoir to allow liquid to flow from the storage reservoir to the buffer reservoir, wherein the buffer reservoir has a fluid capacity that is smaller than a fluid capacity of the storage reservoir; and wherein the capillary element is located outside of the buffer reservoir and arranged to contact liquid received in the buffer reservoir.

2. The capsule according to claim 1, wherein heating element comprises a heating surface and the buffer reservoir is located adjacent to a surface of the heating element which is substantially opposite to the heating surface.

3. The capsule according to claim 2, wherein the heating element, the heating surface, and the capillary element are integrally formed.

4. The capsule according to claim 3, wherein a heater track is positioned on the heating surface of the heating element.

5. The capsule according to claim 2, wherein the heating surface is a first portion of the heating element and the capillary element is a second portion of the heating element, and the first and second portions of the heating element are substantially opposite each other.

6. The capsule according to claim 2, wherein the heating element, the heating surface, and the capillary element are formed from a porous material.

7. The capsule according to claim 6, wherein the porous material is a ceramic.

8. The capsule according to claim 1, wherein the heating element is arranged between the storage reservoir and the buffer reservoir.

9. The capsule according to claim 1, wherein the storage reservoir is located closer to the mouthpiece than the buffer reservoir so that the storage reservoir is located above the buffer reservoir when the capsule is held vertically in its operative configuration such that liquid can flow from the storage reservoir to the buffer reservoir under the action of gravity.

10. The capsule according to claim 1, wherein the buffer reservoir comprises a substantially constant volume of liquid along a length of the buffer reservoir, wherein the length of the buffer reservoir is adjacent to at least one surface of the capillary element.

11. The capsule according to claim 1, wherein the capillary element is supported by at least one spacer.

12. The capsule according to claim 11, wherein the at least one spacer comprises part of the capillary element.

13. The capsule according to claim 11, wherein the at least one spacer comprises a wall of the buffer reservoir, the wall being located substantially opposite to the capillary element.

14. The capsule according to claim 1, wherein the buffer reservoir is delimited by a holder of the capsule comprising a sump, and a seal member.

15. The capsule according to claim 14, wherein the storage reservoir is delimited by an outer casing of the capsule, the seal member, and the mouthpiece, wherein the mouthpiece is located substantially opposite to the seal member.

16. The capsule according to claim 14, wherein the vapor flow path comprises a vapor tube connecting the vaporizing chamber to the mouthpiece, and wherein the vaporizing chamber is sealed by the seal member.

17. The capsule according to claim 14, further comprising an airflow path extending between an air inlet of the capsule and the vaporising chamber for allowing air to flow into the vaporising chamber.

18. The capsule according to claim 17, wherein the air inlet is located on an outer surface of the holder.

19. An electronic cigarette comprising a main body and a capsule, wherein the main body comprises a power supply unit, electrical circuitry, and a capsule seating configured to connect with the capsule, the capsule comprising:

a first end configured to engage with an electronic cigarette device and a second end arranged as a mouthpiece having a vapour outlet, the capsule further comprising:

a storage reservoir configured to store a liquid to be vaporised;

a vaporising chamber arranged to receive liquid received from the storage reservoir;

a heating element housed within the vaporising chamber, the heating element comprising a capillary element configured to vaporise the received liquid and generate a vapour;

a vapour flow path extending between the vaporising chamber and the mouthpiece to allow the generated vapour to flow from the vaporising chamber to the mouthpiece;

a buffer reservoir in fluid communication with the storage reservoir to allow liquid to flow from the storage reservoir to the buffer reservoir, wherein the buffer reservoir has a fluid capacity that is smaller than a fluid capacity of the storage reservoir; and wherein the capillary element is located outside of the buffer reservoir and arranged to contact liquid received in the buffer reservoir.

* * * * *